(12) United States Patent
Zweideck

(10) Patent No.: US 7,396,038 B2
(45) Date of Patent: Jul. 8, 2008

(54) CHILDREN'S VEHICLE WITH A FRAME WITH SLIDING ELEMENTS WITHOUT A SPACE THEREBETWEEN AND CORRESPONDING CHASSIS

(75) Inventor: Bruno Zweideck, Cholet (FR)

(73) Assignee: Ampafrance, Cholet (FR)

( * ) Notice: Subject to any disclaimer, the term of this patent is extended or adjusted under 35 U.S.C. 154(b) by 252 days.

(21) Appl. No.: 10/511,292

(22) PCT Filed: Apr. 16, 2003

(86) PCT No.: PCT/FR03/01229

§ 371 (c)(1), (2), (4) Date: Jun. 20, 2005

(87) PCT Pub. No.: WO03/086834

PCT Pub. Date: Oct. 23, 2003

(65) Prior Publication Data

US 2005/0258619 A1   Nov. 24, 2005

(30) Foreign Application Priority Data

Apr. 16, 2002 (FR) .................................. 02 04962
Nov. 26, 2002 (FR) .................................. 02 14832

(51) Int. Cl.
*B62B 7/06* (2006.01)

(52) U.S. Cl. ..................... 280/642; 280/647; 280/47.38

(58) Field of Classification Search ................. 280/642, 280/647, 643, 648, 47.38
See application file for complete search history.

(56) References Cited

U.S. PATENT DOCUMENTS

| | | | |
|---|---|---|---|
| 4,412,689 A | 11/1983 | Lee | 280/648 |
| 4,844,504 A * | 7/1989 | Bigo | 280/642 |
| 4,915,401 A * | 4/1990 | Severson et al. | 280/30 |
| 5,074,575 A * | 12/1991 | Bigo | 280/642 |
| 5,197,753 A * | 3/1993 | Liu | 280/642 |
| 5,516,142 A * | 5/1996 | Hartan | 280/642 |
| 5,553,885 A * | 9/1996 | Chang | 280/642 |
| 5,709,400 A * | 1/1998 | Bonnier et al. | 280/650 |
| 5,938,230 A | 8/1999 | Huang et al. | 280/650 |
| 6,276,709 B1 * | 8/2001 | Chen et al. | 280/650 |
| 6,428,034 B1 * | 8/2002 | Bost | 280/650 |

FOREIGN PATENT DOCUMENTS
EP 0483042 A1 * 4/1992

* cited by examiner

*Primary Examiner*—Christopher Bottorff
(74) *Attorney, Agent, or Firm*—Westman, Champlin & Kelly, P.A.

(57) ABSTRACT

The invention relates to a child's vehicle with a folding frame, comprising at least one front shaft provided with at least one front wheel, a rear shaft provided with at least one rear wheel, and a pushing device cooperating with a guiding handle, wherein said frame includes at least one assembly of two pieces which can slide in relation to each other without a space therebetween. A first piece of said two pieces has at least one track and the second of said two pieces has at least one slider which slides in said track.

27 Claims, 5 Drawing Sheets

CHILDREN'S VEHICLE WITH A FRAME WITH SLIDING ELEMENTS WITHOUT A SPACE THEREBETWEEN AND CORRESPONDING CHASSIS

CROSS-REFERENCE TO RELATED APPLICATION

This Application is a Section 371 National Stage Application of International Application No. PCT/FR03/01229, filed 16 Apr. 2003 and published as WO 03/086834 A1 on 23 Oct. 2003, not in English, which is based on French Application No. 02/04962, filed 16 Apr. 2002 and French Application No. 02/14832 filed on 26 Nov. 2002, the contents of which are hereby incorporated by reference in their entirety.

FIELD OF INVENTION

The domain of this invention is childcare. More precisely, the invention relates to child's strollers, and particularly folding mechanisms for such child's strollers.

BACKGROUND OF THE INVENTION

Very many techniques are already known for folding stroller frames. In general, an attempt is made to reconcile at least some of the following objectives:
  efficiency of folding, the stroller should be as small as possible when folded so as to facilitate its storage and transport, for example in an automobile vehicle,
  simplicity of folding and unfolding manipulations; the user should be able to perform these operations as simply as possible
  strength and safety of the transported child,
  simplicity and low cost of manufacturing.

One category among the various known frame types is called "broken folding". According to this technique, when in the unfolded position, the push arms are located approximately along the extension of the front stands and tilt with respect to them when folding. The push arms usually tilt downwards, the top end of the push arms moving towards the rear wheels.

Techniques are also known according to which the push arms tilt upwards, such that the top end of the push arm moves closer to the front wheels. This type of technique has been developed particularly by the holder of this patent application for so-called "off-road" strollers that are provided with large wheels (compared with conventional strollers), usually fitted with inflatable tires.

Figure 1:
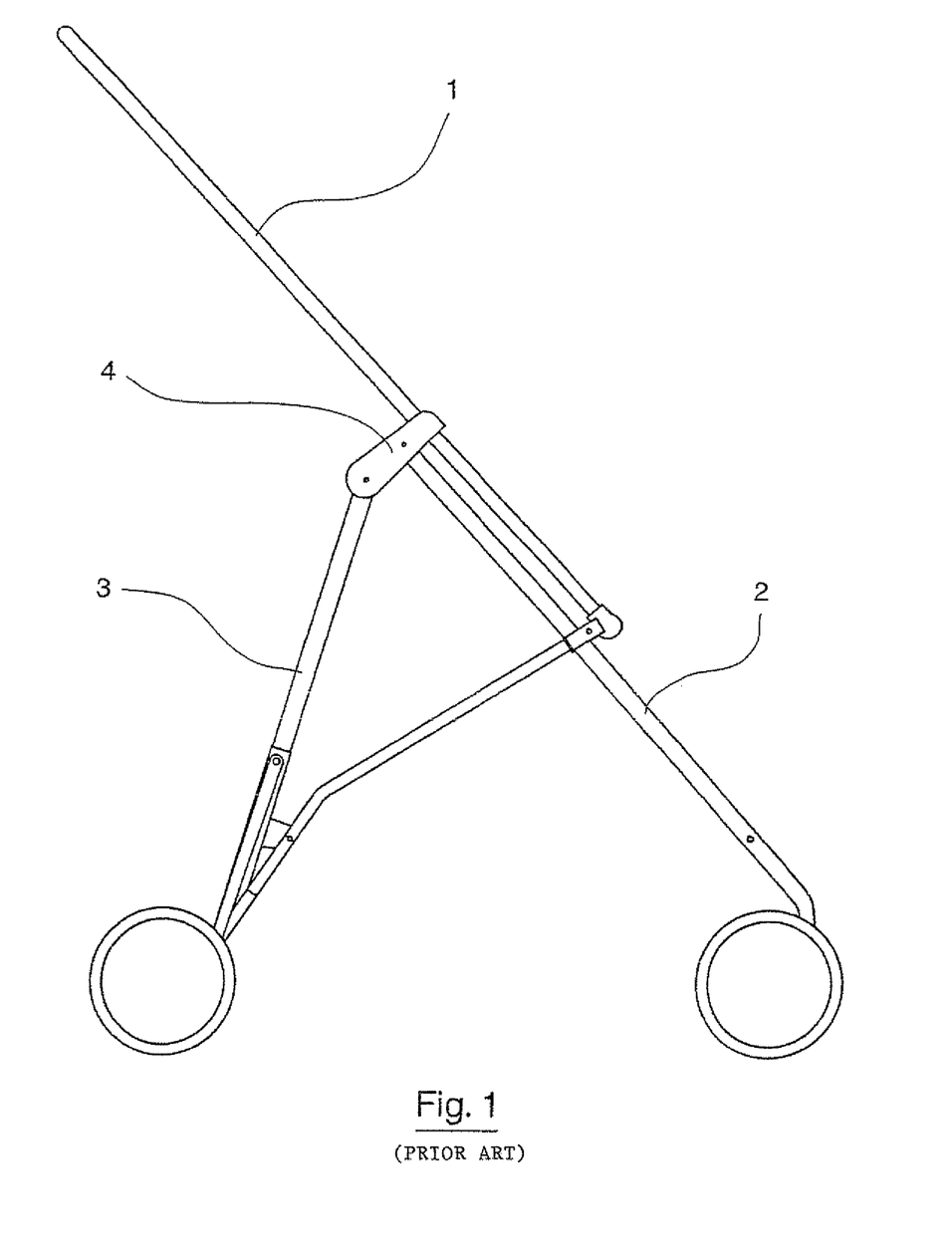
FIG. 1, already commented upon in the preamble, illustrates a child's stroller according to prior art.

Another known technique is shown in FIG. 1. According to this technique, each push arm 1 can slide parallel to the front strut 2 between an extended position in which the push arm forms a continuation of the front strut and a folded position in which the push arm and the front strut corresponding to it are arranged side by side. Each rear strut 3 is articulated close to its top end onto the corresponding front strut.

These various techniques usually have a common factor, by which push arms slide with respect to the front struts. These various elements are made in the form of metallic tubes and sliding is based on a constant principle consisting of using a connecting part 4 installed fixed on the front strut and provided with a slide, at a spacing from the attachment point of the front strut, in which the push arm can slide parallel to the front strut while being separated from it.

With this mechanical assembly, it has been possible to propose several folding techniques using this type of sliding, particularly the techniques mentioned above.

However, this design principle introduces several disadvantages.

The push arm is only guided in a relatively short portion of the connecting part. With part wear and progressive appearance of gradually increasing clearances between them, sliding is affected by offset phenomena so that it becomes difficult for the user to perform the above folding and/or unfolding operations.

Furthermore, connecting parts and push arms are likely to get dirty, to a variable extent depending on the paths along which the child's stroller is taken, and can cause blockage of sliding during folding or unfolding.

Moreover, during folding and unfolding operations of the stroller, the user or the child being carried might accidentally slide his or her fingers into the space between the push arm and the front strut, at the risk of getting them trapped with more or less serious consequences.

SUMMARY OF THE INVENTION

The purpose of this invention is to overcome the different disadvantages of the prior art.

More precisely, the purpose of the invention is to propose a child's stroller for which the frame uses a mechanical assembly for folding that is more reliable than solutions according to prior art.

In this sense, the purpose of the invention is to supply such a child's stroller in which the efficiency and reliability of sliding is improved, and is therefore not subject to the effects of intensive use, or in which these effects are minor (wear, appearance of clearances, etc.).

Another purpose of the invention is to supply such a child's stroller in which the mechanical sliding assembly is not subject to the effects of cumulated dirt, or only slightly.

Another purpose of the invention is to provide such a child's stroller in which the risks of fingers getting trapped or other such unpleasant occurrences during folding are significantly reduced.

Yet another purpose of the invention is to supply such a child's stroller that is easy to manufacture and to assemble.

Another purpose of the invention is to supply such a child's stroller, for which the technical folding means are capable of developing new designs and new presentations.

These objectives, and others that appear later, are satisfied using the child's stroller with a folding frame, including particularly at least one front strut, on which at least one front wheel is fitted, one rear strut on which at least one rear wheel is fitted, and a push arm cooperating with a guide handle. According to the invention, the said frame implements at least one assembly of two parts one sliding with respect to the other with no space between them, one of the said first parts having at least one rail and the second of the said parts having at least one slide designed to slide in the said rail.

Preferably, at least one of the said assemblies is formed from one of the said push arms and one of the said front struts.

The result is thus sliding guides that are better than those in solutions according to prior art, due to the fact that the push arm and the strut slide with respect to each other with no space between them, one forming a rail and the other forming a slide.

The rail and the slide are permanently in direct or indirect contact with each other, consequently the mechanical assembly is not subject to or is only slightly subject to the occurrence of play that could prevent the smooth operation of parts sliding with respect to each other, as is the case with conventional solutions.

Therefore, a permanently reliable solution is obtained.

Moreover, the risk of getting fingers trapped between the push arm and the front strut no longer exists because there is no space between these two elements.

Note that the invention can be equally applicable to child's strollers with four wheels (with a front strut on each side of the stroller), and to child's strollers with three wheels (with a single front strut).

According to one advantageous solution, the said rear strut is articulated to the said front strut and has a contact area with the said front strut defined so as to be inscribed within a complementary area defined within the said front strut.

Preferably, when the said child's stroller is folded, the said push arm, the said front strut and the said rear strut form a contiguous assembly.

The result is a particularly ergonomic and aesthetic assembly, particularly in the folded state of the child's stroller.

Advantageously, the said contiguous assembly has a uniform and compact section.

The various elements making up the frame form a compact and rigid assembly when the child's stroller is in its folded position, which is particularly useful when moving and/or lifting it, for example to put it into the trunk of a vehicle.

According to a first embodiment, at least one rod with a low coefficient of friction is fitted between the said sliding parts.

According to another embodiment, at least one part made from a material with a low coefficient of friction is clipped onto the said rail and/or the said slide.

In each case, the result is that the capacity of the parts to slide adjacent to each other is significantly improved.

Advantageously, the said part made from a material with a low coefficient of friction is a skid and/or a wire, and preferably comprises at least one chrome-plated or zinc-plated wire.

The said rodor the said part is advantageously fluorescent (at least on visible parts) so that the child's stroller can be seen more easily at night. When placed in this location, this type of fluorescent device will have better long term resistance than fluorescent adhesive tape or other similar means placed on child's strollers and that tend particularly to separate or deteriorate under the effect of various friction.

Means of cleaning the sliding area are preferably provided on at least one of the said sliding parts. In this case, the said cleaning means advantageously include at least one scraper brush installed on the end of the said push arm.

In this way, the possibilities of the sliding mechanism getting dirty are considerably limited, or at least the undesirable effects of this dirt accumulation are limited, since dirt is eliminated by the folding/unfolding operations of the child's stroller.

According to one advantageous solution, the said push arm and the said front strut are connected by a first connecting part while the said front strut and the said rear strut are connected by a second connecting part, the said first and second connecting parts stopping one against the other in the unfolded position of the said stroller.

Preferably, the said push arm, the said front strut and/or the said rear strut are made from section elements. In this case, the said section elements are made from materials belonging to the group comprising:
aluminium,
anodised aluminium,
ceramic aluminium,
composite materials,
extruded materials,
pultruded materials,
PTFE,
PE,
silicone,
wood.

Advantageously, the sections are made from extruded metallic materials, and particularly from aluminium that has many advantages and particularly:
its density, so that lightweight parts can be obtained,
its quality/price ratio,
its surface condition, which does not necessarily require further processing,
its workability using simple routine techniques (riveting, welding, etc.) compared with other materials, for example such as composite materials.

Advantageously, the inside of at least one of the said section type elements is adapted so that at least one type of special equipment can be fitted into it.

The result is that elements or mechanisms, for example such as cableways, can be placed inside sections where they are concealed.

Preferably, at least one of the said assemblies is formed by two parts belonging to the group comprising:
the front stand,
the rear stand,
the handlebar.

Advantageously, the child's stroller comprises rolling elements to facilitate sliding of the said parts forming the said assembly.

In this case, the said rolling elements are preferably collected in at least one carriage mounted on the end of one of the said parts forming the said assembly.

According to one advantageous solution, the child's stroller comprises a first carriage installed on the lower end of the push arm of the said child's stroller and a second carriage mounted on the top end of the front strut of the said child's stroller.

Preferably, the said rolling elements belong to the group consisting of balls, wheels and rollers.

According to another characteristic, the child's stroller comprises two similar sliding assemblies, each comprising a front strut and a push arm, for each of the sides of the said child's stroller.

According to a first embodiment, the child's stroller comprises two symmetrical front struts distributed on each side of the frame.

According to another embodiment, the child's stroller comprises a single sliding assembly, comprising the said front strut and the said push arm. In this case, the said single sliding assembly preferably extends approximately along the longitudinal axis of the said child's stroller.

According to another characteristic, the said front strut(s) is (are) articulated with respect to the said rear strut(s). In this case, the shapes of the said front and rear strut(s) are preferably at least partially complementary so that they can be inscribed one in the other when the said stroller is in its folded position.

The invention also relates to a folding frame for a child's stroller like that described above.

Other characteristics and advantages of the invention will become clearer after reading the following description of an embodiment, given for illustrative purposes and the figures.

DETAILED DESCRIPTION OF THE PREFERRED EMBODIMENTS

With reference to FIG. 1, it can be seen that child's strollers comprising a folding frame, according to prior art conventionally and almost always comprise a sliding mechanism allowing the push arm 1 to slide with respect to the strut 2, according to which the push arm slides parallel to and at a distance from the front strut, being guided by a connecting part 4.

The invention proposes a fundamentally new approach that is not obvious knowing this prior art.

Figure 2A:
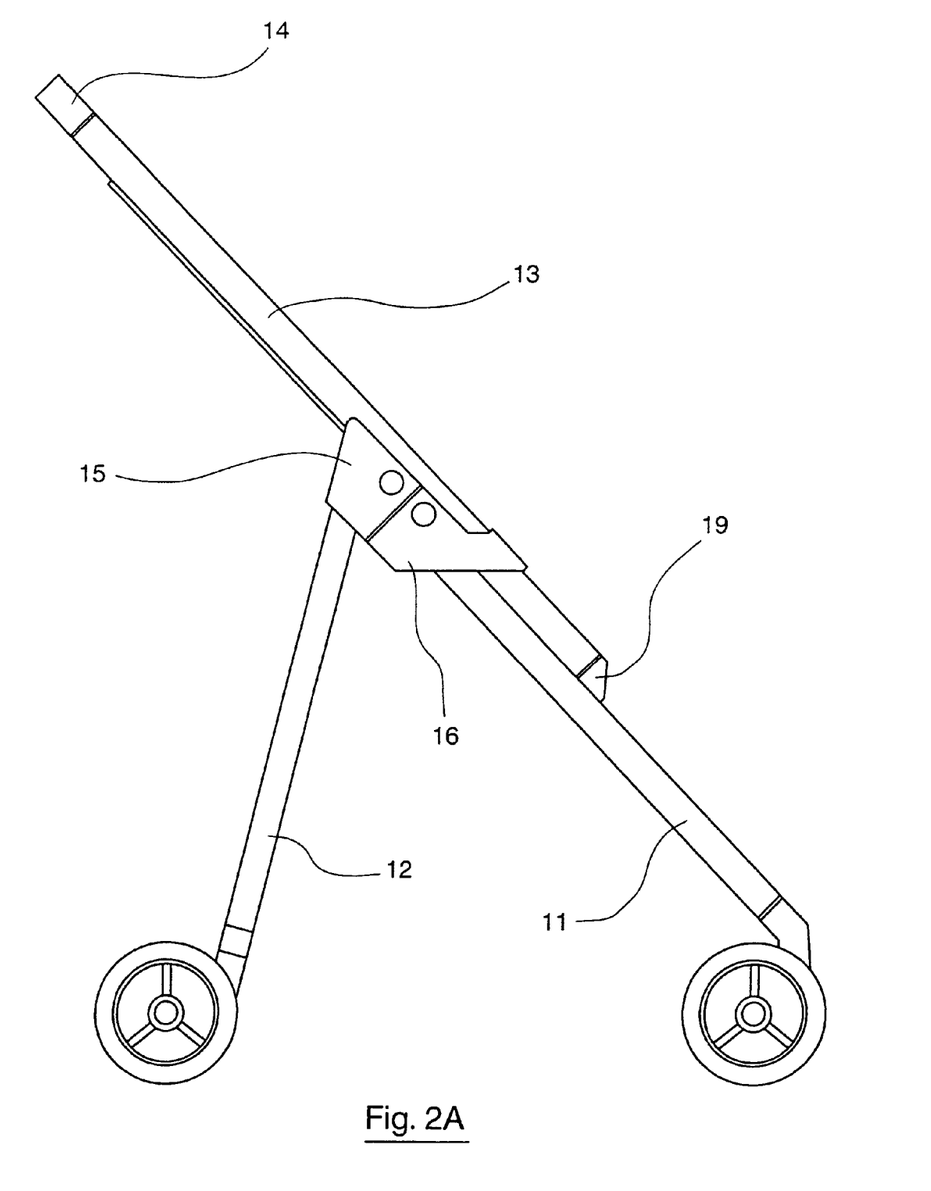
FIGS. 2A and 2B show a child's stroller according to the invention, in the folded position and in the unfolded position respectively.
Figure 2B:
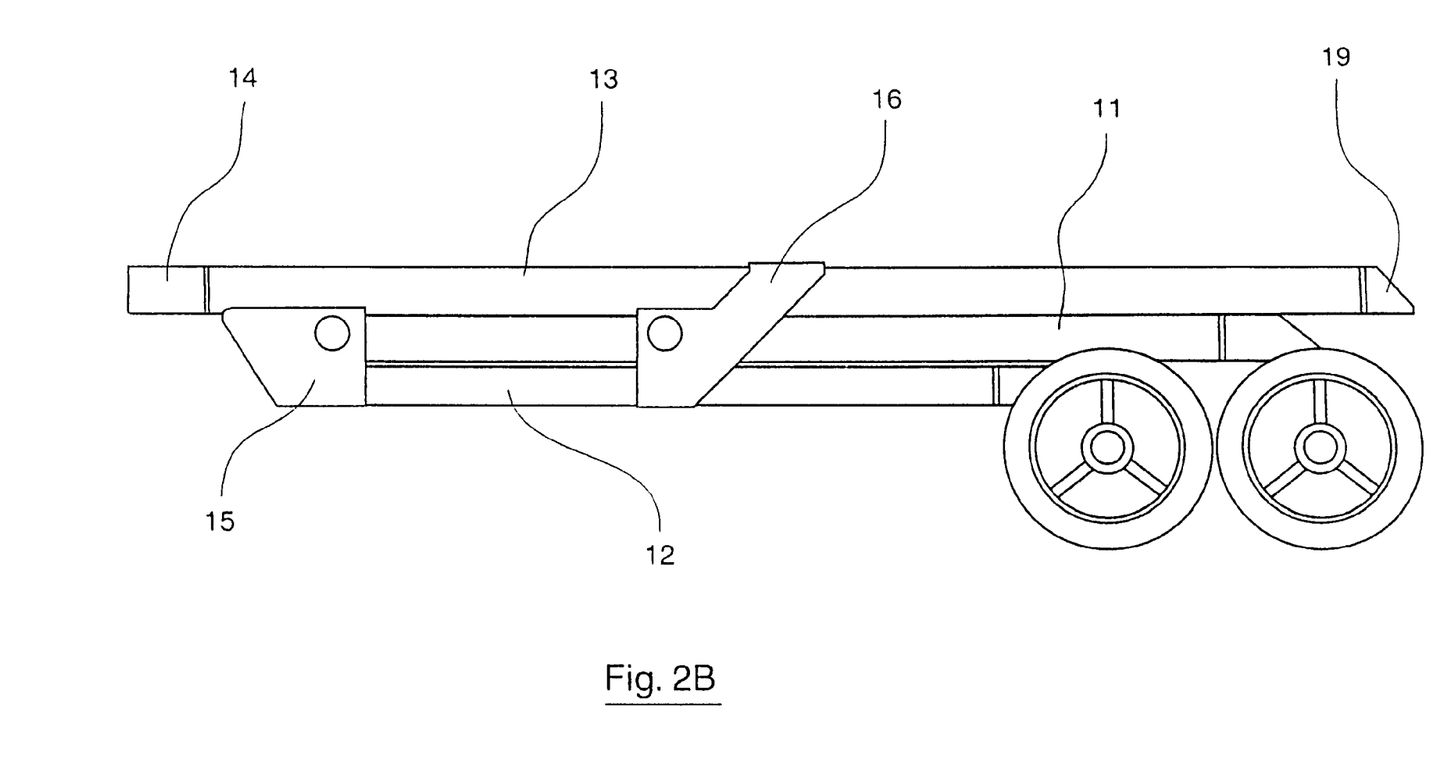

As shown in FIGS. 2A and 2B, a child's stroller with a folding frame comprises a front strut 11 on each side of the stroller, on which at least one front wheel is fitted, a rear strut 12 comprising one or two (or more) rear wheels, and a push arm 13 cooperating with a guide handle 14.

It can be seen in these figures that the solution according to the invention results in a quite innovative, aesthetic and ergonomic presentation, which also limits risks of getting trapped.

According to the invention, the push arm 13 and the front strut 11 are fixed to each other and form an assembly of two parts free to slide with respect to each other without any space between them.

Figure 3:
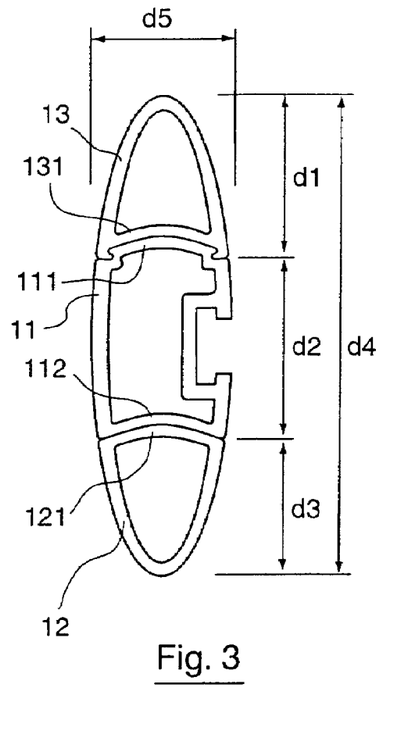
FIG. 3 is a top sectional view and FIG. 4 is a perspective sectional view of a contiguous assembly formed by the front strut, the rear strut and the push arm of the child's stroller in FIGS. 2A and 2B.
Figure 4:
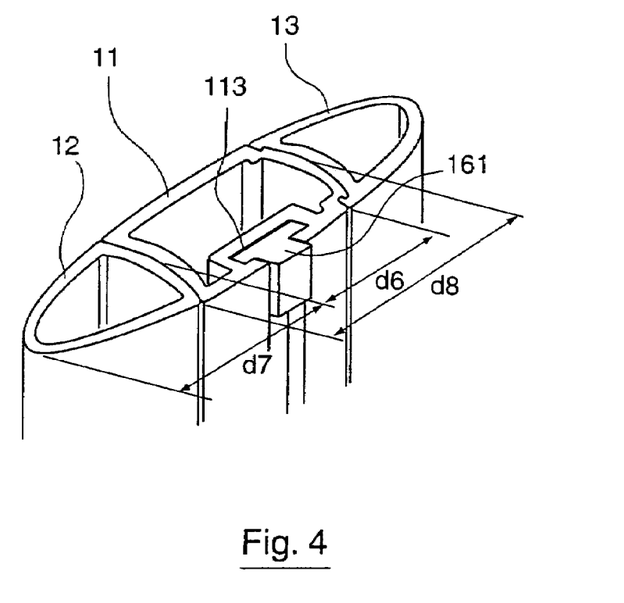

To achieve this, as can be seen more clearly in FIGS. 3 and 4, the push arm 13 is fitted with a rail 131 while the front strut 11 is fitted with a slide 111 formed so that it can slide in the rail 131.

Note that according to another possible embodiment, the rail could be supported by the front strut while in this case the slide would be supported by the push arm. It would also be possible to envisage several rails and/or slides on each part or any other combination enabling sliding between the parts without any space, without departing from the scope of the invention.

According to the embodiment presented, the front strut 11, the rear strut 12 and the push arm 13 are made from aluminium section elements. In other embodiments, these section elements could be made from anodised or ceramic aluminium, composite materials, PTFE or PE, or wood, the sections being shaped by different techniques such as extrusion or pultrusion processes for materials for which these techniques can be used.

The rear strut 12 is also articulated with respect to the front strut 11 using a connecting part 15 (FIGS. 2A and 2B), for example made of plastic.

Thus, the child's stroller according to the invention can be unfolded (FIG. 2A) and folded (FIG. 2B).

In the embodiment illustrated, a complementary connecting part 16, for which a portion 161 (FIG. 4) penetrates into a complementary shaped recess 113 is provided in the front strut 11. This complementary connecting part 16 is installed on the front strut 11 such that it stops in contact with the connecting part 15 when the child's stroller is unfolded. The part 16 may be made from the same material as the part 15, to give the same overall impression particularly in the unfolded position.

However, note that this part 16 does not guide sliding of the front strut and the push arm, and it does not hold them in their corresponding positions, this is achieved simply as the result of the shape (rail/slide) applied to them according to the invention. Consequently, the part 16 will not necessarily exist in other embodiments.

In the folded position of the child's stroller, the push arm 13, the front strut 11 and the rear strut 12 form a contiguous assembly with a homogeneous and compact section, and an elliptical shape according to this embodiment. Obviously, other sections could be envisaged and this section can vary.

This contiguous assembly is obtained when the child's stroller is folded, particularly due to the fact that the rear strut 12 has a contact surface 121 defined so that it is inscribed in a complementary surface 112 of the front strut 11.

The contiguous assembly is also formed in a complementary manner by the push arm 13 and the front strut 11 installed so that one is free to slide in the other.

For example, the dimensions of such a contiguous assembly and the parts composing it could be as follows, in the embodiment shown in the figure:

$d_1$=37 mm,
$d_2$=36 mm,
$d_3$=32 mm,
$d_4$=105 mm,
$d_5$=32 mm,
$d_6$=36 mm,
$d_7$=37 mm,
$d_8$=43 mm.

Also as an indication, the lengths of the push arm, the front strut and the rear strut in this case are 970 mm, 700 mm and 550 mm.

Note that the shape of the complementary surfaces 112 and 121 according to this embodiment is curved, but they could be in a different shape (square, trapezoidal, etc.) according to other possible embodiments.

Moreover, the elliptical section of the contiguous assembly is an ergonomically and aesthetically useful shape, that is possible due to the principle of the invention. Obviously many other sections could be envisaged, depending on technical or aesthetic requirements.

Figure 5:
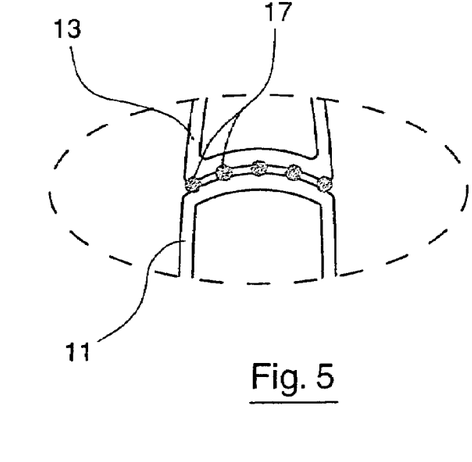
FIG. 5 is a sectional view of a first embodiment of means facilitating sliding of the push arm with respect to the front strut.

According to a first embodiment to optimise sliding of the push arm 13 with respect to the front strut 11, retaining rings 17 with a low coefficient of friction are installed between the push arm 13 and the front strut 11.

It can be understood that the number and position of these retaining rings 17 as shown in FIG. 5 are provided for information and can vary whenever necessary.

Figure 6:
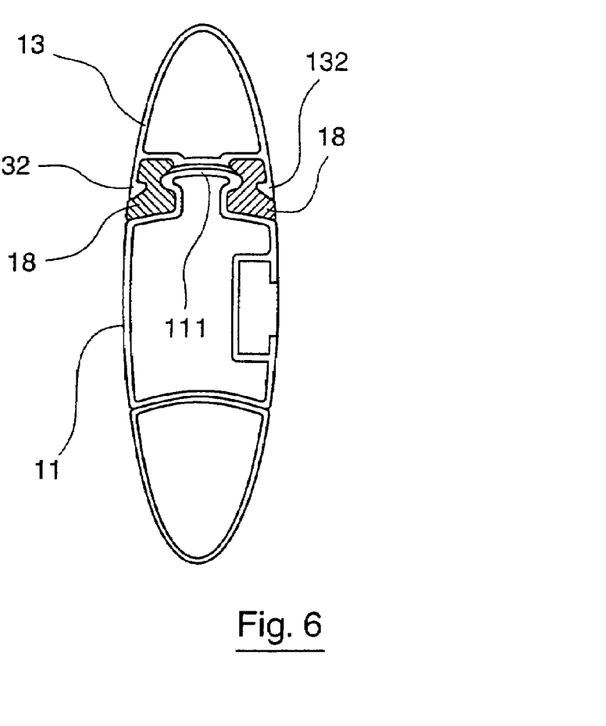
FIG. 6 is a sectional view of a second embodiment of means facilitating sliding of the push arm with respect to the front strut.

According to another embodiment shown in FIG. 6, sliding is achieved by means of skids 18 made of Teflon (or alternately made of plastic, polymer, polyolefin or any other material with a low coefficient of friction).

These skids 18 are shaped so that they are retained on the push arm 13 by clipping means 132, while they partially match the shape of the slide 111 of the front strut 11. Note that the skids may be simply inserted on the push arm.

Figures 7, 8, 9, 10:
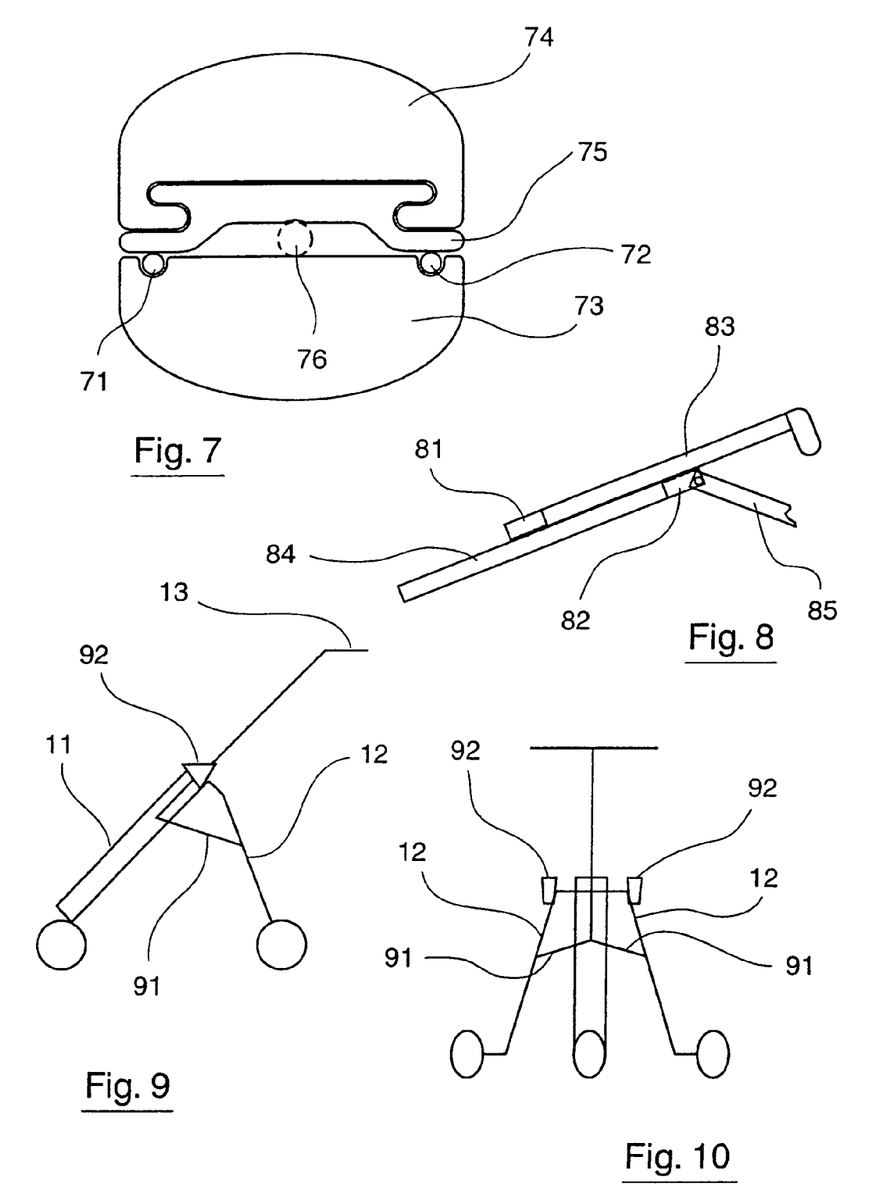
FIG. 7 shows a variant embodiment of sliding, using chrome-plated or zinc-plated wires.
FIG. 8 illustrates another variant embodiment of sliding, implementing the ball-mounted carriages.
FIGS. 9 to 11 are diagrammatic views of a child's stroller with three wheels based on the principle of the invention, with FIG. 9 showing the profile, FIG. 10 showing a front view when in the extended position, and FIG. 11 showing the folded position.

According to yet another variant, and particularly if it is required to paint the sliding elements with an epoxy paint instead of applying a treatment such as anodisation, it would be possible to insert contact areas as shown in FIG. 7.

Thus, two chrome-plated or zinc-plated wires are inserted (usually, elements forming contact areas) 71 and 72, for example by clipping in housings provided in one of the sliding elements 73 for this purpose, and that can thus be painted.

The other element of the sliding assembly 74 supports a polymer part 75 according to the principle described above, and which comes into contact with the wires 71 and 72.

Obviously, there may be only one contact area, for example a central wire 76 (shown in dashed lines) or there may be more than two wires (for example wires 71, 72 and 76) depending on needs and constraints.

According to yet another variant of the invention, it is also possible that two parts of the sliding assembly are in direct contact with each other, without rodor wire. Used materials will be selected in order to guarantee good sliding quality and good reliability.

Preferably, these retaining rings or these skids (or at least the visible parts of them) are made from a fluorescent material (or a material containing fluorescent pigments, or coated with a fluorescent coating), or a reflecting material to make the child's stroller easy to see at night or in the twilight.

Moreover, means of cleaning the sliding zone are provided so as to eliminate dirt that could collect on the sliding means, or at least to limit the effects of this dirt collection.

In this embodiment, these cleaning means comprise a scraper brush fitted on the lower end 19 of the push arm 13.

It can be understood that the section of this scraper brush 13 matches the section of the slide 111 so as to eliminate all dust or other deposits on it that could hinder sliding of the push arm with respect to the front strut.

Additionally, or alternately, this type of brush could be installed at the other end, for example in the part 15.

Note that the lower end 19 also acts as a stand, in the folded and straight position (FIG. 2B).

FIG. 8 illustrates another embodiment of the invention, using rolling elements such as balls, wheels, or rollers. These rolling elements may be arranged in any appropriate manner to facilitate sliding.

According to the embodiment in FIG. 8, two ball-mounted carriages (for example) are provided. The first carriage 81 is mounted on the lower end of the push arm 83 and forms the end piece of the push arm. The second carriage 82 is mounted on the top end of the front strut 84 and carries the rear strut 85 through an articulation 85.

The front strut 84 and the push arm 83 are advantageously equipped as above with a polymer or similar retaining ring. The two carriages 81, 82 (or at least one of the two) may be equipped with brushes or other protection and/or cleaning means.

A single carriage may be provided if required.

Obviously, the invention is not limited to the embodiment described above, but on the contrary applies to all child's strollers implementing such sliding means.

Thus, the frame may be made according to various known approaches, and the folding/unfolding dynamics may be adapted accordingly. For example, the child's stroller may be equipped with three wheels, including a central front wheel.

According to one particular embodiment of this invention, the child's stroller thus comprises a single sliding assembly as described above. Preferably, this single assembly then extends along a central axis with respect to the child's stroller (corresponding to the plane of the central wheel in the case of a child's stroller with three wheels).

Figure 11:
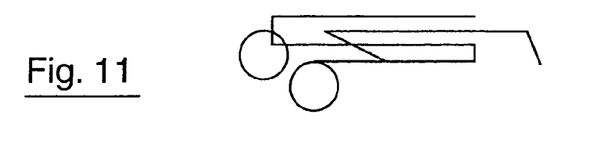

FIGS. 9 to 11 diagrammatically illustrate such a child's stroller.

The frame is composed of a central beam (front strut) 11 and a push arm 13 prolonging this central beam. These parts fit telescopically one onto the other or one into the other.

A rear strut 12 on each side is articulated near the top on the front strut 11.

A lateral connecting rod 91 on each side connects the rear strut 12 to the push arm 13 and guarantees that the frame remain unfolded.

At least one fixed wheel will be fixed to each end of the rear struts 12, and the wheel located at the front (single or twin) can be fixed or free to rotate.

The frame is folded starting by displacement of the push arm 13 with respect to the front strut 11 and simultaneous folding of the rear struts 12 along the front strut.

The frame becomes as compact as possible when the push arm 13, the front strut 11 and the rear struts 12 form a contiguous assembly and the two rear wheels are in contact.

This platform can indifferently be fitted with a group 0 car seat, a hammock facing forwards or facing the mother pushing the stroller, or any other product designed for carrying a child, by means of an appropriate attachment system 92.

The same sliding principle can also be applied additionally or alternately to the handlebar of the child's stroller and not only on the wheel supports.

Note also that this approach is advantageously applicable to child's strollers that can be transformed into a cradleboard, that can be carried on the back of an adult.

Although the present invention has been described with reference to preferred embodiments, workers skilled in the art will recognize that changes may be made in form and detail without departing from the spirit and scope of the invention.

The invention claimed is:

1. Child's stroller with folding frame, comprising:
at least one front strut on which at least one front wheel is fitted,
a rear strut on which at least one rear wheel is fitted, and
a push arm cooperating with a guide handle,
wherein said frame implements at least one assembly of two parts one sliding with respect to the other with no space between them, the first of said parts having at least one rail and the second of said parts having at least one slide designed to slide in said rail.

2. Child's stroller according to claim 1, wherein at least one of said at least one assembly is formed from one of said push arms and one of said front struts.

3. Child's stroller according to claim 1, wherein said rear strut is articulated to said front strut, and has a contact area with said front strut defined so as to be inscribed within a complementary area defined within said front strut.

4. Child's stroller according to claim 2, wherein when said child's stroller is folded, said push arm, said front strut and said rear strut form a contiguous assembly.

5. Child's stroller according to claim 4, wherein said contiguous assembly has a uniform and compact section.

6. Child's stroller according to claim 1, wherein at least one rod with a low coefficient of friction is fitted between said sliding parts.

7. Child's stroller according to claim 1, wherein at least one part made from a material with a low coefficient of friction is clipped onto at least one of said rail or said slide.

8. Child's stroller according to claim 7, wherein said part made from a material with a low coefficient of friction comprises at least one of a skid or a wire.

9. Child's stroller according to claim 8, wherein said part comprises at least one chrome-plated or zing-plated wire.

10. Child's stroller according to claim 1 and further comprising a material, which is positioned between said rail and said slide, has a low coefficient of friction and is at least partially fluorescent.

11. Child's stroller according to claim 1, wherein means of cleaning the sliding area are provided on at least one of said sliding parts.

12. Child's stroller according to claim 11, wherein said cleaning means include at least one scraper brush installed on the end of said push arm.

13. Child's stroller according to claim 2, wherein said push arm and said front strut are connected by a first connecting part while said front strut and said rear strut are connected by a second connecting part, said first and second connecting parts stopping one against the other in the unfolded position of said stroller.

14. Child's stroller according to claim 1, wherein at least one of said push arm, said front strut, or said rear strut are made from section elements.

15. Child's stroller according to claim 14, wherein said section elements are made from at least one material belonging to the group comprising:
aluminimum,
anodised aluminium,
ceramic aluminium,
composite materials,
extruded materials,
pultruded materials,
PTFE,
PE,
silicone,
wood.

16. Child's stroller according to claim 14, wherein the inside of at least one of said section type elements is adapted so that at least one type of special equipment can be fitted into it.

17. Child's stroller according to claim 1, wherein at least one of said at least one assembly is formed by two parts belonging to the group comprising:
the front strut,
the rear strut,
the guide handle.

18. Child's stroller according to claim 1, wherein the stroller comprises rolling elements to facilitate sliding of said parts forming said assembly.

19. Child's stroller according to claim 18, wherein said rolling elements are preferably collected in at least one carriage mounted on the end of one of said parts forming said assembly.

20. Child's stroller according to claim 19, wherein the stroller comprises a first carriage installed on the lower end of the push arm of said child's stroller and the second carriage mounted on the top end of the front strut of said child's stroller.

21. Child's stroller according to claim 18, wherein said rolling elements belong to the group consisting of balls, wheels and rollers.

22. Child's stroller according to claim 1, wherein the stroller comprises two similar sliding assemblies, each comprising a front strut and a push arm respectively for each of the sides of said child's stroller.

23. Child's stroller according to claim 1, wherein the stroller comprises a single sliding assembly, comprising a front strut and a push arm.

24. Child's stroller according to claim 23, wherein said single sliding assembly extends approximately along the longitudinal axis of said child's stroller.

25. Child's stroller according to claim 1, wherein said front strut(s) is (are) articulated with respect to said rear strut(s).

26. Child's stroller according to claim 25, wherein said front and rear strut(s) have at least partially complementary shapes so that they can be inscribed one in the other when said stroller is in its folded position.

27. Folding frame for a child's stroller according to claim 1.

* * * * *